Nov. 17, 1964  C. J. MANN  3,157,408
CHUCK CONSTRUCTION
Filed May 31, 1962  4 Sheets-Sheet 4
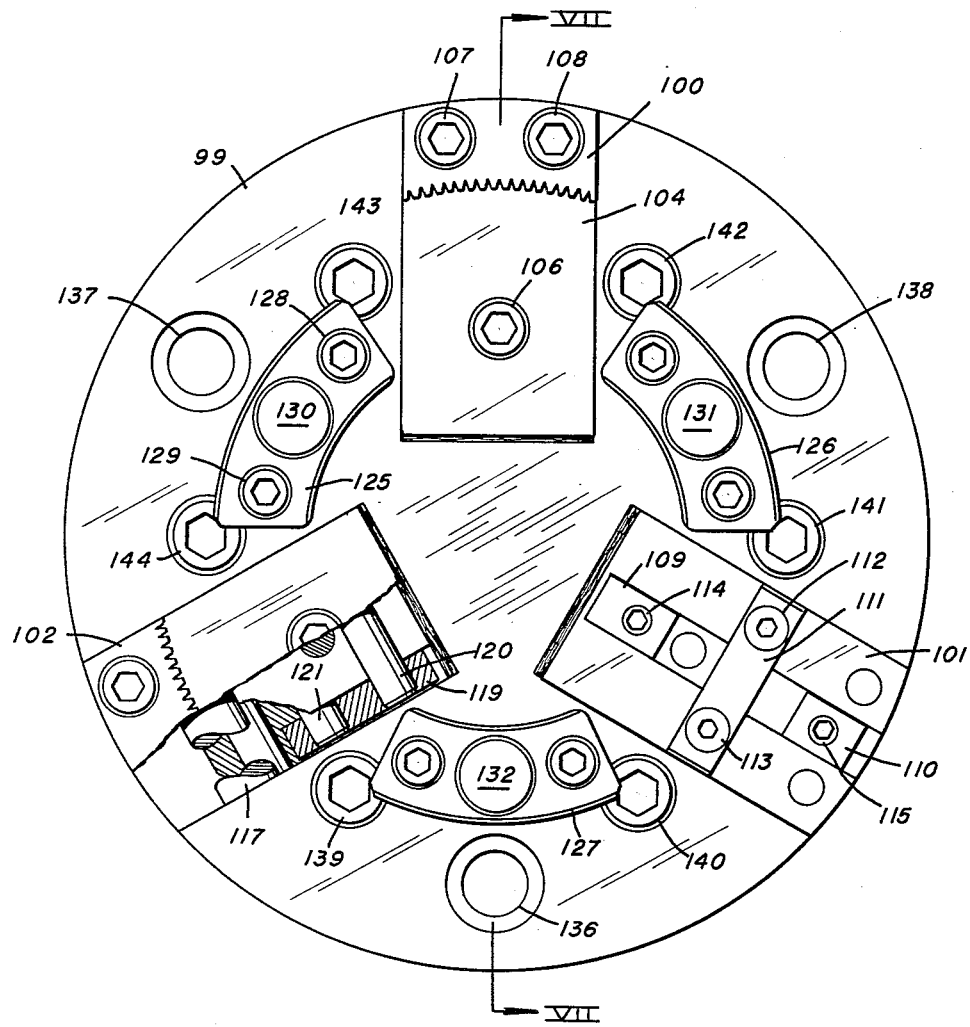
CHARLES J. MANN
INVENTOR.
BY
*Glenn B. Moore*
atty.

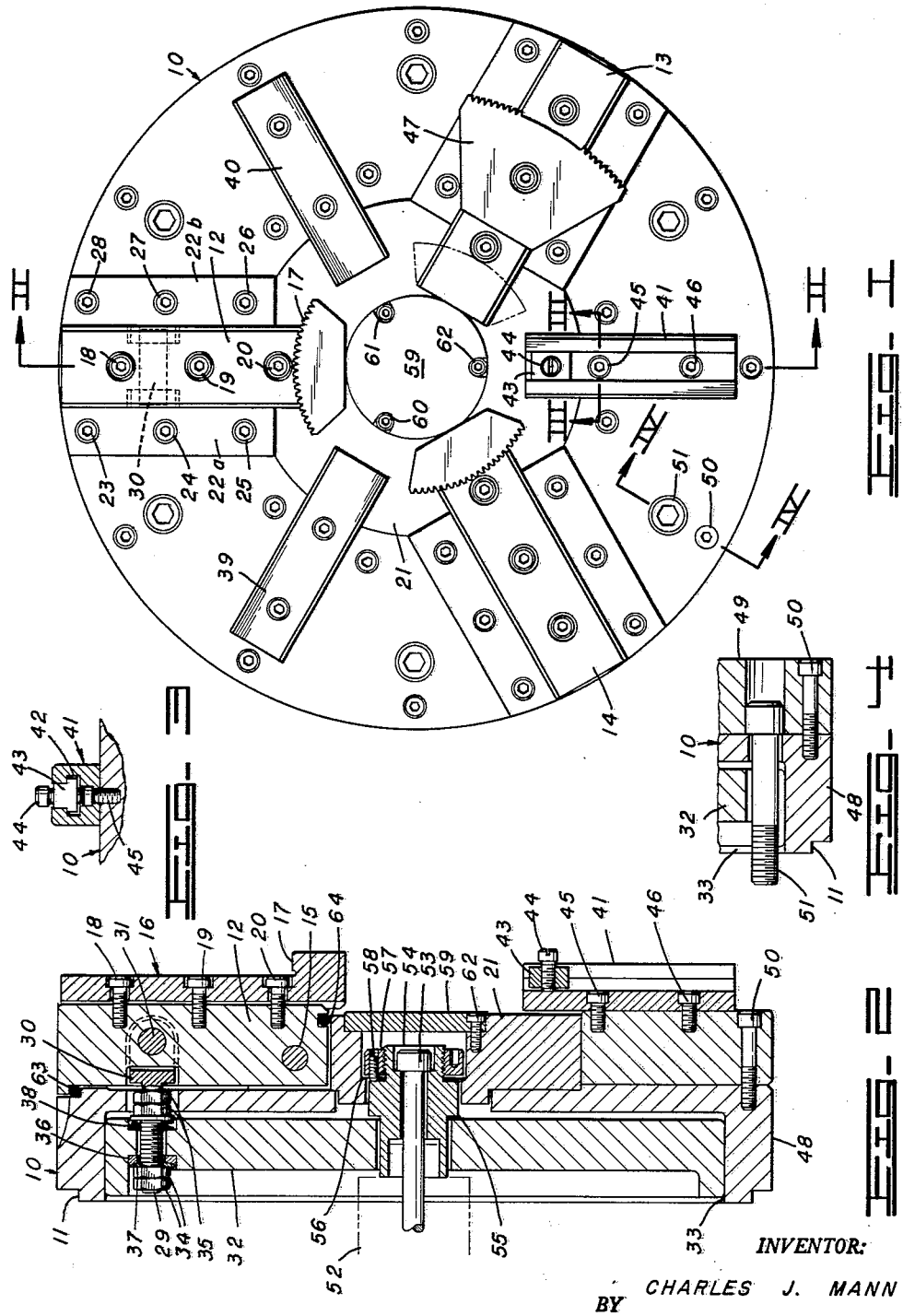

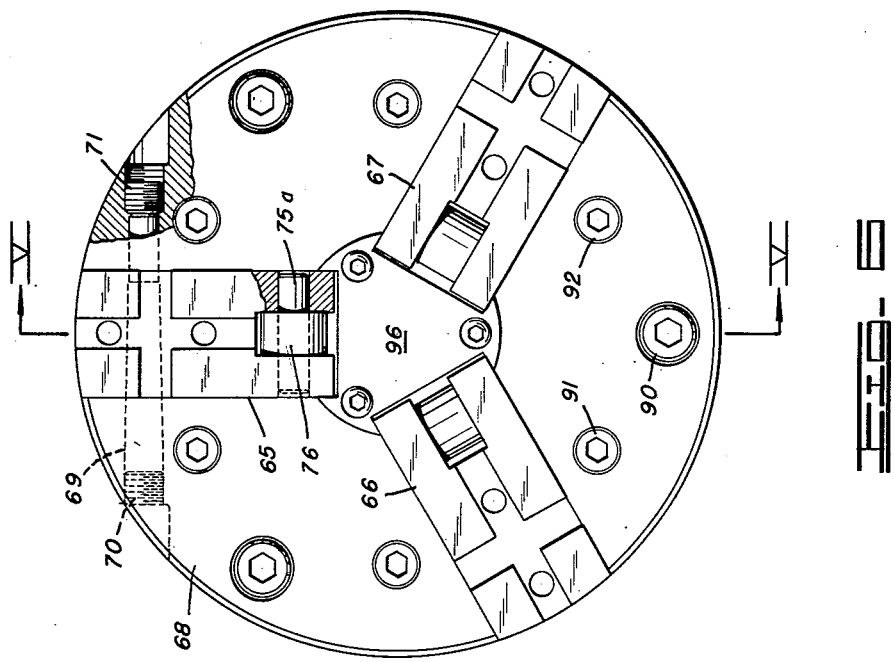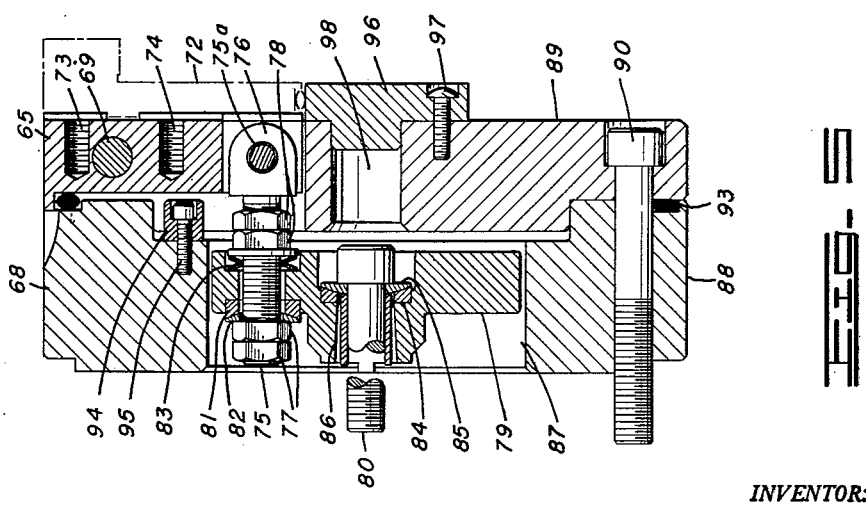

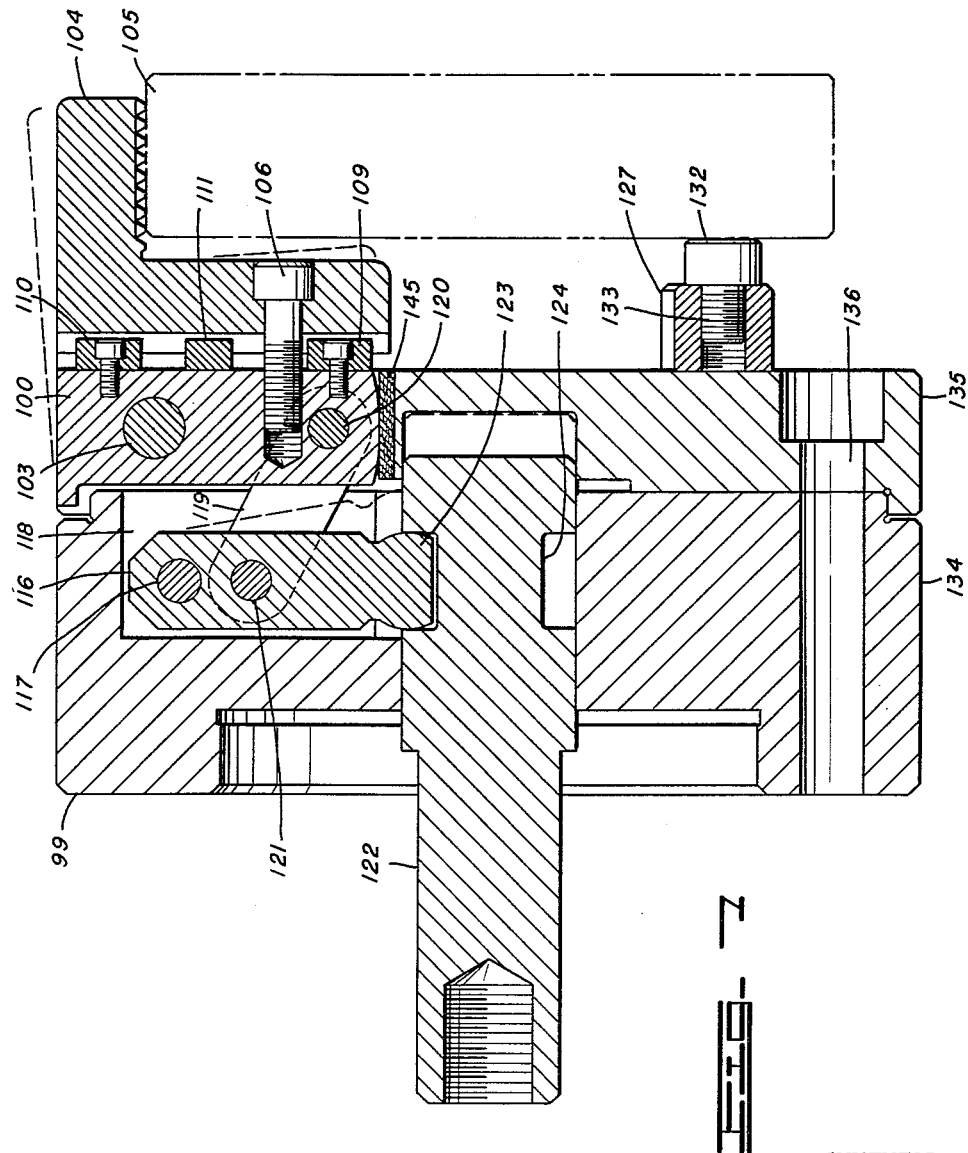

United States Patent Office 3,157,408
Patented Nov. 17, 1964

3,157,408
CHUCK CONSTRUCTION
Charles J. Mann, 1048 Peninsula Drive,
Traverse City, Mich.
Filed May 31, 1962, Ser. No. 199,056
5 Claims. (Cl. 279—106)

This invention relates to the construction of power-actuated chucks. These devices are normally mounted on the spindles of production lathes for gripping work pieces in connection with a rotary machining operation. A chuck of this type is usually adapted to handle a large number of work pieces of about the same size, and the jaw movement from release to gripping position is comparatively small. The present invention relates particularly to the actuation of the jaws, which are pivotally mounted in the chuck frame so that a gripping portion of each jaw generates a movement having a radial component with respect to the axis of rotation of the chuck.

The jaws are each positioned by a link which transmits forces from an actuating mechanism based upon the reciprocating movement of a rod controlled by devices outside the chuck. In some applications, the work pieces are positioned by a fixture as they are engaged by the chuck, and the chuck must take these pieces as they are presented. One modification of the invention provides for accommodating considerable eccentricity between the gripped surface of the work piece and the chuck axis. In cases requiring greater jaw forces (or a larger mechanical advantage between the actuating rod and the jaw), an intervening lever system is used between the rod and the links.

The several features of the invention will be analyzed in further detail through a discussion of the particular embodiments illustrated in the accompanying drawings. In the drawings:

FIGURE 1 presents a front elevation of a self-aligning chuck equipped with an adjustable driving support for the work pieces.

FIGURE 2 presents a sectional elevation on the plane II—II of FIGURE 1.

FIGURE 3 is a section taken on the plane III—III of FIGURE 1.

FIGURE 4 is a section taken on the plane IV—IV of FIGURE 1.

FIGURE 5 presents a sectional elevation on the plane V—V of FIGURE 6, showing a modified form of the invention.

FIGURE 6 is a front elevation of the chuck illustrated in FIGURE 5.

FIGURE 7 is a sectional elevation of a further modification, involving a lever mechanism for multiplying actuating forces.

FIGURE 8 is a front elevation of the chuck structure shown in FIGURE 7.

Referring to FIGURES 1 to 4, inclusive, the illustrated chuck includes a frame 10 having a locating offset 11 for engaging the spindle structure (not shown) of a conventional lathe. The jaw members 12, 13, and 14 are each pivotally mounted with respect to the frame on pins as shown at 15 in FIGURE 2. To accommodate the jaw members to particular production work pieces, the removable inserts 16 provide gripping surfaces 17 which are so located with respect to the axis of the pivot pins 15 that the reciprocating articulation of the jaw members will result in a movement of the gripping surfaces 17 in a substantially radial direction. Preferably, the inserts 16 are mounted with a tongue and groove engagement, and are secured in place through the use of screws as shown at 18–20. The pivot pins 15 are preferably received in the central plate 21, which are secured to the frame 10 by the screws 23–28.

An adjustable link bolt 29 is associated with each of the jaws, and includes a fork 30 having a pivotal connection to the jaw on the pin 31. A transverse plate 32 is slidably mounted in the bore 33 in the frame 10 for axial movement, and this axial movement generates the pivotal movement of the jaws through the forces applied via the link bolts 29. Pairs of nuts 34 and 35 determine the adjusted axial position of the bolt with respect to the plate 32, and the interengaging washers 36 and 37 are provided with mating spherical surfaces which permit considerable angular articulation of the axis of the bolt with respect to that of the plate 32. The spring washers 38 maintain a resilient pressure in opposition to the spherical washers 36 and 37, with an end result that the pivotal movement of the jaws 12 can be accommodated by the link bolts without distorting the position of the plate with respect to the axis of rotation of the chuck assembly.

The abutments 39, 40, and 41 provide reference surfaces against which work pieces may be placed to determine a fixed axial position for engagement with the jaws. In many situations, it is desirable to effect a rotary driving connection with the work pieces to supplement the frictional effect of the jaws, and the abutment 41 is constructed as shown in FIGURE 3 for this purpose. A guideway is formed as shown at 42 which receives a slide member 43 containing a projecting stud 44 in the form of the head of a machine screw. The screws 45 and 46 secure the member 41 to the frame 10, and the tightening of the screw 44 will serve to lock the adjusted radial position of the screw and the slide member 43 through bearing engagement of the inner end of the screw with the base of the guide way 42. In this manner, the position of the head of the screw 44 may be selected to engage a suitable opening in the work piece (not shown) to provide a rotary driving engagement for the transfer of torque to supplement the frictional effect of the jaws at the surfaces 17. When jaw inserts of the type and position shown at 47 are engaged, it may be necessary to re-adjust the position of the application of driving torque provided by the screw 44. This adjustment is a very simple one, and permits a chuck assembly to be converted easily from one work piece to another.

The frame structure 10 may be developed in a variety of arrangements, the illustrated preferred form including an inner plate 48 to which an outer plate 49 is secured by screws as shown at 50 in FIGURE 4. The screws shown at 51 are used to secure the entire assembly to the spindle structure (not shown) of the lathe on which the chuck is mounted. Such machines conventionally includes an actuating rod as shown in dotted lines at 52 in FIGURE 2, and this member is controlled by suitable mechanism which induces a reciprocating axial movement to operate the chuck. Forces are transferred to the chuck through the securing bolt 53, and via the plug 54 at the shoulder 55. The plate 21 is provided with a shoulder 56 which functions as a stop abutment limiting the axial movement of the plug 55, and is engaged by a nut 57. The position of the nut 57 with respect to the plug 54 will establish the selected stop position, and this can be maintained by the set screw 58, so that the removal of the nut does not result in the loss of the adjusted position. A cover plate 59 is secured to the central plate 21 by the screws 60–62 to prevent the entrance of foreign particles, and sealing strips as shown at 63 and 64 may be employed to close off the openings into the interior of the chuck at the moving parts. Cover plates as shown at 22a and 22b are used at the sides of the jaws, and are secured by screws 23–28. These plates also retain the central plate 21 in the frame against axial movement.

Referring now to FIGURES 5 and 6, the modification illustrated in these views has the characteristic of being able to grip work pieces on surfaces having considerable eccentricity with respect to the axis of the chuck. The jaw members 65, 66, and 67 are pivotally mounted on the frame 68 on taper pins as identified at 69. The taper of these pins makes it possible to re-adjust the mounting of the jaws to compensate for wear. As the pin is moved axially, by adjustment of the set screws 70 and 71 at the opposite ends, the effective diameter of the pin may be increased so as to compensate for enlargement of the bore in the jaw members. Inserts as shown at 72 in dotted lines are normally secured to the jaw members with screws engaging the tapped holes 73 and 74 in each of the jaw members.

Each of the jaw members is provided with a link bolt 75 having an outer end 76 connected to the jaw member at a pin 75a remote from the pivot pin. As in the modification shown in FIGURE 2, the link bolts are equipped with pairs of nuts 77 and 78 that may be adjusted to determine the relative axial position of the bolts with the transverse plate 79 transferring forces from the push-rod assembly 80. Mating spherical washers 81 and 82 provide for angular articulation between the link bolts 75 and the plate 79, with the spring washers 83 maintaining a resilient pressure on the spherical washer assembly. A spherical washer assembly is also utilized in securing the plate 79 with respect to the actuating rod assembly 80. The washers 84 and 85 interengage on spherical surfaces, and the bore 86 in the plate 79 engaged by the push-rod assembly is provided with sufficient clearance to permit considerable angular articulation of the plate 79 with respect to the axis of the chuck. If a work piece engaged by the jaws 72 has a gripped surface somewhat eccentric with respect to the axis of the chuck, one of the jaw members 65–67 will encounter resistance before the others. As the actuating rod assembly continues with its axial movement to the left, as shown in FIGURE 5, the plate 79 begins to tilt as a result of the termination of the axial movement of that part of it which is associated with the particular jaw member which has first encountered the resistance. The tilting movement continues until all of the jaws have encountered obstruction. In this manner, the chuck is capable of adapting itself to considerable eccentricity in the work pieces. A holding fixture may therefore place a work piece in the exact position desired with respect to the axis of rotation, which may have some variance with respect to the surface on which the jaw members actually engage.

The plate 79 is loosely received in the bore 87 in the inner plate 88 of the chuck shown in FIGURE 5 so that the angular articulation is readily accommodated. The outer plate 89 is secured with respect to the inner plate 88 with the bolts 90, and these bolts are also utilized to secure the clutch assembly to the spindle (not shown) of the lathe. Another group of bolts as shown at 91 and 92 may be used to secure the outer plate 89 with respect to the inner plate 88, without extending into the spindle. A sealing ring as shown at 93 is preferably incorporated to seal the assembly against the entrance of foreign material, and a hardened abutment member 94 may be secured to the inner plate 88 by screws as shown at 95 to act as a stop limiting the movement of each of the jaw members. The cover plate 96 is secured with screws as shown at 97 to seal off the central opening 98 provided to expose the end of the push rod assembly for attachment and detachment.

Referring to FIGURES 7 and 8, this modification of the invention includes a frame 99 to which the jaw members 100, 101 and 102 are pivotally connected on pins as shown at 103 in FIGURE 7. Special jaw inserts as shown at 104 are designed to accommodate particular work pieces such as that indicated at 105 in FIGURE 7, and these inserts are secured by the bolts 106, 107, and 108. The key members as shown at 109, 110, and 111 engage opposite grooves in the jaws and inserts, respectively, to maintain the alignment. The transverse central key bar 111 is secured to the jaw members 104 with screws 112 and 113. The key blocks 109 and 110 are respectively secured by the screws 114 and 115.

A lever 116 is pivotally mounted to the frame 99 on the pins 117, as shown in FIGURE 7, in recesses 118 in the frame opposite each of the jaw members 100. A pair of links 119 extends from the pins 120, engaging the jaw members, to the pins 121 engaging the levers, and transfers forces from the levers to the jaw members to generate the pivotal gripping movement in response to the axial movement of the actuating rod 122. The ends 123 of the levers 116 are formed as shown in FIGURE 7 to engage the annular recess 124 in the rod 122 as to transmit the axial forces involved in actuating the jaw system. The position of the pin 121 with respect to the pin 117, in a radial direction with respect to the axis of the entire chuck assembly, will determine the mechanical advantage of the force transfer between the levers and the jaw members.

The abutment members 125–127 are secured by screws as shown at 128 and 129, and support the hardened bearing members 130–132 to establish a reference position for the work pieces 105, as shown in FIGURE 7. It is preferable that the bearing members 132 have a threaded extension as shown at 133 engaging a corresponding threaded bore in the supporting members so that the bearing members are readily replaceable.

The frame of the chuck structure shown in FIGURES 7 and 8 involves an inner plate 134 and an outer plate 135 secured in relative position by bolts normally engaging the openings 136–138, which also normally engage the spindle structure of the lathe. A group of bolts 139–144 independently secures the inner and outer plates together, and suitable sealing material as shown at 145 is incorporated to close off the openings at the movable components to prevent the ingress of foreign material.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. A chuck structure, comprising:
a frame;
a plurality of jaws pivotally mounted for limited reciprocating movement in said frame in angularly spaced relationship about a frame axis, and said jaws each having an axis of rotation with respect to said frame disposed in a plane substantially perpendicular to said frame axis, said jaws each having a gripping portion disposed with respect to said jaw axis to generate a movement having a radial component with respect to said frame axis as said jaws pivot;
actuating means including a rod having substantially axial reciprocating movement with respect to said frame;
a transverse plate carried by said rod with freedom of angular articulation with respect to said rod; and
a link connecting each of said jaws to said plate.
2. A chuck structure, comprising:
a frame;
a plurality of jaws pivotally mounted for limited reciprocating movement in said frame in angularly spaced relationship about a frame axis, and said jaws each having an axis of rotation with respect to said frame disposed in a plane substantially perpendicular to side frame axis, said jaws each having a gripping portion disposed with respect to said jaw axis to generate a movement having a radial component with respect to said frame axis as said jaws pivot;
actuating means including a rod having substantially axial reciprocating movement with respect to said frame;

a transverse plate secured to said rod with freedom of angular articulation with respect to said rod; and a link connecting each of said jaws to said plate.

3. A chuck structure, comprising:

a frame;

a plurality of jaws pivotally mounted for limited reciprocating movement in said frame in angularly spaced relationship about a frame axis, and said jaws each having an axis of rotation with respect to said frame disposed in a plane substantially perpendicular to said frame axis, said jaws each having a gripping portion disposed with respect to said jaw axis to generate a movement having a radial component with respect to said frame axis as said jaws pivot;

actuating means including a rod having substantially axial reciprocating movement with respect to said frame;

a transverse plate secured to said rod; and means operably connecting each of said jaws to said plate.

4. A chuck structure, comprising:

a frame;

a plurality of jaws pivotally mounted for limited reciprocating movement in said frame in angularly spaced relationship about a frame axis, and said jaws each having an axis of rotation with respect to said frame disposed in a plane substantially perpendicular to said frame axis, said jaws each having a gripping portion disposed with respect to said jaw axis to generate a movement having a radial component with respect to said frame axis as said jaws pivot;

actuating means having substantially axial reciprocating movement with respect to said frame;

a transverse plate mounted in said frame for axial movement with respect thereto, and secured to said actuating means with freedom of angular articulation with respect to said frame axis; and a link connecting each of said jaws to said actuating means.

5. A chuck structure, comprising:

a frame;

a plurality of jaws pivotally mounted for limited reciprocating movement in said frame in angularly spaced relationship about a frame axis, and said jaws each having an axis of rotation with respect to said frame disposed in a plane substantially perpendicular to said frame axis, said jaws each having a gripping portion disposed with respect to said jaw axis to generate a movement having a radial component with respect to said frame axis as said jaws pivot;

actuating means including a transverse plate having substantially axial reciprocating movement with respect to said frame; and link bolt means connecting each of said jaws to said plate, said link bolt means being adjustable with respect to the extension thereof from said plate to said jaws.

References Cited in the file of this patent

UNITED STATES PATENTS

| 1,467,992 | Becker | Sept. 18, 1923 |
| 2,712,449 | Grobey | July 5, 1955 |
| 2,865,643 | Parker | Dec. 23, 1958 |
| 3,044,791 | Nicosia | July 17, 1962 |